United States Patent Office 2,859,215
Patented Nov. 4, 1958

2,859,215

PROCESS FOR PREPARATION OF CYCLONITE

Roland J. Spomer, Clinton, Ind., assignor, by mesne assignments, to Olin Mathieson Chemical Corporation, a corporation of Virginia No Drawing. Application April 19, 1956
Serial No. 579,159

4 Claims. (Cl. 260—248)

This invention relates to explosives and more particularly to a novel process for the preparation of cyclotrimethylenetrinitramine.

Cyclotrimethylenetrinitramine, more commonly and hereinafter referred to as cyclonite, has been prepared by a number of processes but the most satisfactory process from all aspects involves the nitrolysis of hexamethylenetetramine by means of highly concentrated nitric acid. While this general process has found wide commercial acceptance it leaves much to be desired because normally the yield of cyclonite obtained is not appreciably above 75% of the theoretical yield.

The yield has been materially increased by the utilization of reagents added to the reaction mixture of nitric acid and hexamethylenetetramine. Thus, it has been reported that ammonium nitrate, ammonium sulfate and phosphorus pentoxide when added to the reaction mixture tend to increase the yield of cyclonite obtained. While the yield may be increased in this manner, the use of such compounds is coupled with the introduction of attendant difficulties into the process. Any such adulterant added to the reaction mixture must necessarily be removed from the finished product and requires the addition of at least one more step to the process together with more complex equipment that must be closely coordinated with the apparatus normally used in the nitrolysis operation. In addition, the amounts of such materials added to the reaction mixture must be closely controlled or the efficiency of the process will be very seriously impaired.

It is an object of this invention to provide a process for the preparation of cyclonite that overcomes the disadvantages of the prior art. Another object of this invention is to provide a process for the nitrolysis of hexamethylenetetramine to cyclonite in which high yields may be obtained without resorting to the use of adulterants. It is a further object of this invention to provide a novel process for the preparation of cyclonite.

In accordance with this invention, generally speaking, these and other objects are accomplished by conducting the nitrolysis of hexamethylenetetramine at a temperature below about —10° C. More specifically, this invention contemplates the nitrolysis of hexamethylenetetramine at a temperature below about —10° C. but greater than about —42° C., the freezing point of 99% nitric acid. While it has been found that satisfactorily high yields of cyclonite can be obtained when the reaction temperature is maintained between —10° C. and —42° C., it is preferred to carry out this reaction at a temperature of about —30° C. Although somewhat higher yields are generally obtained by operating at temperatures below —30° C., operation at this temperature provides very satisfactory yields, and the additional refrigeration required to maintain the lower temperatures is not warranted by the relatively small increase of cyclonite obtained thereby. In addition, when the reaction is carried out at this temperature it is quite a simple matter to keep the temperature of the reaction mixture from going above —10° C. at which point the yield of cyclonite obtained drops off sharply. However, the reaction may also be conveniently carried out at about —15° C.

In carrying out the process of this invention the nitric acid is cooled to the operating temperature, that is, between about —10° C. and about —42° C. and the hexamethylenetetramine is slowly added to the nitric acid. The acid is agitated during the addition of the hexamethylenetetramine and the agitation is continued throughout the reaction period. The nitrolysis of the hexamethylenetetramine takes place rapidly and thus the reaction is generally completed very shortly after the hexamethylenetetramine has been added to the agitated acid solution. This process is also readily adapted to continuous processes in which portions of hexamethylenetetramine are intermixed with a stream of concentrated nitric acid.

The yield of cyclonite obtained by this process can be materially increased by heating the reaction mixture immediately after nitrolysis to a temperature between about 0° C. and about 20° C. and maintaining it at that temperature for a period of about 20 to 40 minutes, or by rapidly heating the reaction mixture to a temperature between about 80° C. and 90° C., and immediately quenching the heated reaction mixture with an excess of cold water. In some instances it is desirable to utilize both of these operations in connection with the process of this invention. In such cases the reaction mixture is warmed to a temperature of from about 0° C. to about 20° C. and after holding it at that temperature for about 20 to 40 minutes the reaction mixture is then rapidly heated to between about 80° C. and about 90° C. and quenched with an excess of cold water. The reaction mixture must be heated as rapidly as possible and in practice this is most conveniently achieved by passing a thin layer of the reaction mixture over a series of heated baffles or the like.

In carrying out the process of this invention the proportions of nitric acid to hexamethylenetetramine can vary within relatively wide limits but the ratio of these two reactants must be maintained within a ratio of about 8:1 to about 15:1 by weight. The utilization of less than about 8 parts of nitric acid for each part of hexamethylenetetramine causes a significant drop in the amount of cyclonite obtained, amounts of nitric acid in excess of 15 parts for each part of hexamethylenetetramine do not enter into the reaction. The nitric acid used in carrying out this invention preferably has a concentration of about 99% and it has been found that the acid must have a concentration greater than about 98% in order to insure satisfactory yields. Thus, the nitric acid must have a concentration between about 98 and 100%.

In order to clarify the invention and to more fully describe the method in which it is carried out to achieve its various objects the following is a description of embodiments thereof. In these embodiments the amounts of materials used are designated in parts by weight.

*Example I*

3 parts of hexamethylenetetramine were gradually added to 33 parts of 99.7% nitric acid over a period of about 10 minutes while maintaining the acid at a temperature of about —30° C. The acid was agitated throughout the addition of the hexamethylenetetramine. After all of the hexamethylenetetramine was added to the acid, this mixture was immediately heated to a temperature of about 85° C. This heating was accomplished in about 2½ minutes. As soon as the reaction mixture had attained this temperature, 150 parts of ice water were added thereto and the cyclonite which precipitated from the solution was removed by filtration. The cyclonite was slurried with water and the slurry heated for one hour at about 95° C. The slurry was then cooled and filtered and the recovered cyclonite was dried. The yield thus obtained was more than 86% of the theoretical yield.

*Example II*

3 parts of hexamethylenetetramine were nitrolyzed with 33 parts of 99.6% nitric acid at a temperature of —30° C. in accordance with the procedure set forth in Example I. After the addition of the hexamethylenetetramine had been completed, however, the temperature of the reaction mixture was raised to about 20° C. and maintained at that temperature for about 20 minutes. At the end of this period about 150 parts of ice water were added to the mixture and the precipitated cyclonite was slurried, deacidified and dried in accordance with the procedure set forth in Example I. The yield in this case was slightly less than that obtained in Example I but was still greater than 85% of the theoretical yield.

*Example III*

3 parts of hexamethylenetetramine were gradually added to 24 parts of 99.8% nitric acid while agitating the solution and maintaining it at a temperature of about —15° C. This addition was made over a period of about 2½ minutes and immediately upon its completion the mixture was heated to a temperature of about 90° C. in about one minute. When this temperature was attained the reaction mixture was flooded with 150 parts of ice water and the precipitated cyclonite was filtered therefrom and processed as set forth in the previous examples. The yield was more than 86% of the theoretical yield.

From the above description and examples it is clear that the present invention accomplishes its objects and provides a simplified method for the preparation of cyclonite by which optimum yields are obtained. Furthermore, this invention achieves these objects without the addition of additives or adulterants which lead to problems of purification, separation and recovery of the cyclonite.

Although the function of the reduced temperature of the reaction mixture may be partially explained by a number of theories, the exact mechanism of the reaction involved in the process is not fully understood. Regardless of the manner in which the maintenance of the reduced temperature operates, it is abundantly clear that it provides a simple expedient for materially increasing the amount of cyclonite that can be obtained by the nitrolysis of hexamethylenetetramine.

What is claimed is:

1. A process for the preparation of cyclonite which comprises mixing concentrated nitric acid with hexamethylenetetramine in ratios between about 8:1 and about 15:1 by weight while agitating the mixture and maintaining the temperature between about —42° C. and about —10° C., heating the reaction mixture to a temperature from about 80° C. to about 90° C., immediately adding an excess of cold water to the reaction mixture, and separating the cyclonite which precipitates from the mixture.

2. A process for the preparation of cyclonite which comprises mixing concentrated nitric acid with hexamethylenetetramine in ratios between about 8:1 and about 15:1 by weight while agitating the mixture and maintaining the temperature between about —42° C. and about —10° C., elevating the temperature of the reaction mixture to a temperature between about 0° C. and about 20° C. and maintaining this temperature for about 20 to about 40 minutes, heating the mixture to a temperature of about 80° C. to 90° C., immediately adding an excess of cold water to the reaction mixture, and separating the cyclonite which precipitates from the mixture.

3. A process for the preparation of cyclonite which comprises mixing concentrated nitric acid with hexamethylenetetramine in ratios between about 8:1 and about 15:1 by weight while agitating the mixture and maintaining the temperature between about —42° C. and about —10° C., elevating the temperature of the mixture to a temperature between about 0° C. and about 20° C. and maintaining that temperature for a period of about 20 to about 40 minutes, immediately adding an excess of cold water to the reaction mixture, and separating the cyclonite which precipitates from the mixture.

4. A process for the preparation of cyclonite which comprises mixing about 11 parts of concentrated nitric acid with 1 part of hexamethylenetetramine while agitating the mixture at a temperature of approximately —30° C., heating the reaction mixture to a temperature of about 80° C. to about 90° C., adding an excess of cold water to the reaction mixture when the temperature between 80° C. and 90° C. is attained and separating the cyclonite which precipitates from the mixture.

References Cited in the file of this patent

UNITED STATES PATENTS 2,678,927    Wright et al. _____ May 18, 1954

FOREIGN PATENTS 104,280    Germany _____ July 1898
658,976    Great Britain _____ Oct. 17, 1951
388,615    Great Britain _____ Mar. 2, 1933

OTHER REFERENCES

Hale: J. Am. Chem. Soc., vol. 47, pp. 2754–2763 (1927).

Chemical Abstracts, vol. 29, pp. 4328[6] (1935) abstract of Sollazzo, Boll. Chim. Farm., vol. 74, p. 221 (1935).

Sollazzo: Boll. Chim. Farm., vol. 74, pp. 221–227 (1935).